United States Patent
Oliaei et al.

(10) Patent No.: US 11,092,616 B2
(45) Date of Patent: Aug. 17, 2021

(54) METHOD AND DEVICE FOR BAND-PASS SENSOR DATA ACQUISITION

(71) Applicant: INVENSENSE, INC., San Jose, CA (US)

(72) Inventors: Omid Oliaei, Sunnyvale, CA (US); Peter George Hartwell, Menlo Park, CA (US)

(73) Assignee: INVENSENSE, INC., San Jose, CA (US)

(*) Notice: Subject to any disclaimer, the term of this patent is extended or adjusted under 35 U.S.C. 154(b) by 186 days.

(21) Appl. No.: 16/182,029

(22) Filed: Nov. 6, 2018

(65) Prior Publication Data
US 2020/0141967 A1 May 7, 2020

(51) Int. Cl.
*G01P 15/125* (2006.01)

(52) U.S. Cl.
CPC .................. *G01P 15/125* (2013.01)

(58) Field of Classification Search
CPC ..................................................... G01P 15/125
See application file for complete search history.

(56) References Cited

U.S. PATENT DOCUMENTS

| 6,693,573 | B1 | 2/2004 | Linder |
| 9,574,907 | B2 | 2/2017 | Chevroulet |
| 2010/0194615 | A1 | 8/2010 | Lu |
| 2016/0056783 | A1* | 2/2016 | Wang .................. H03F 3/45475 330/254 |
| 2018/0011125 | A1* | 1/2018 | Oshima ................. G01P 15/125 |

OTHER PUBLICATIONS

Schreier et al., "Bandpass and Quadrature Delta-Sigma Modulation," Understanding Delta-Sigma Data Converters, pp. 139-178 (40 pages) (undated).

\* cited by examiner

*Primary Examiner* — Paul M. West
*Assistant Examiner* — Mark A Shabman
(74) *Attorney, Agent, or Firm* — Haley Guiliano LLP; Joshua V. Van Hoven; Stefan D. Osterbur

(57) ABSTRACT

A microelectromechanical (MEMS) sensor has a capacitance that varies based on a sensed force. A charge signal representing that capacitance is provide at an input node of an amplifier of a sense circuit. The sense circuit includes a filter and analog-to-digital converter. Feedback from the filter and the analog-to-digital converter is also received at the input node of the amplifier. The sense circuit outputs a digital signal that is representative of the sensed force.

7 Claims, 10 Drawing Sheets

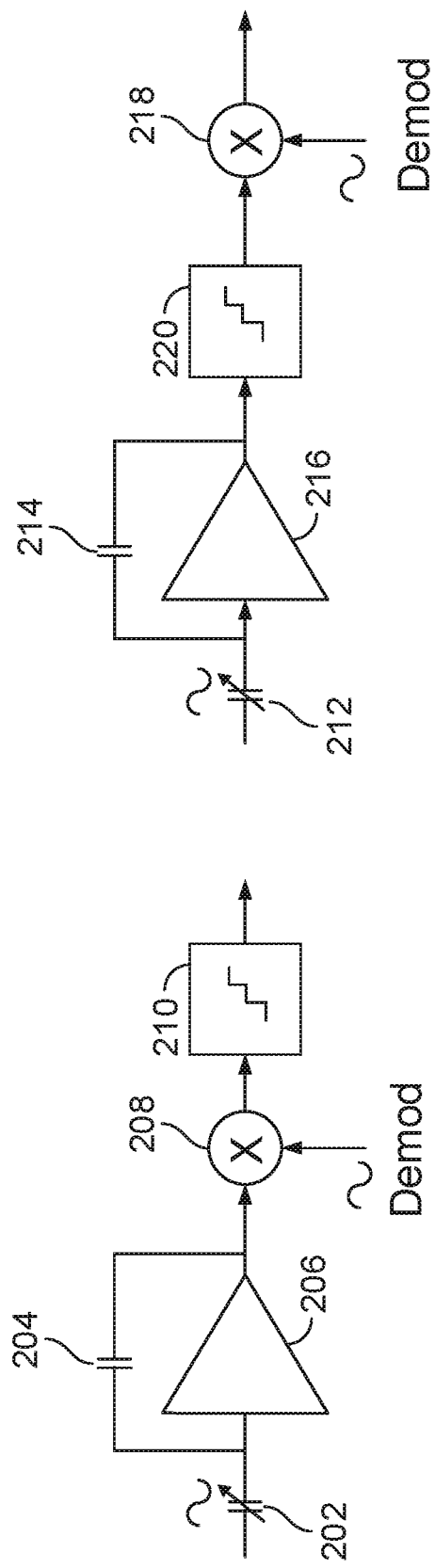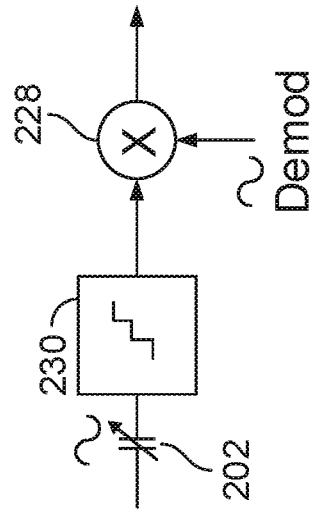
FIG. 2A
FIG. 2B
FIG. 2C

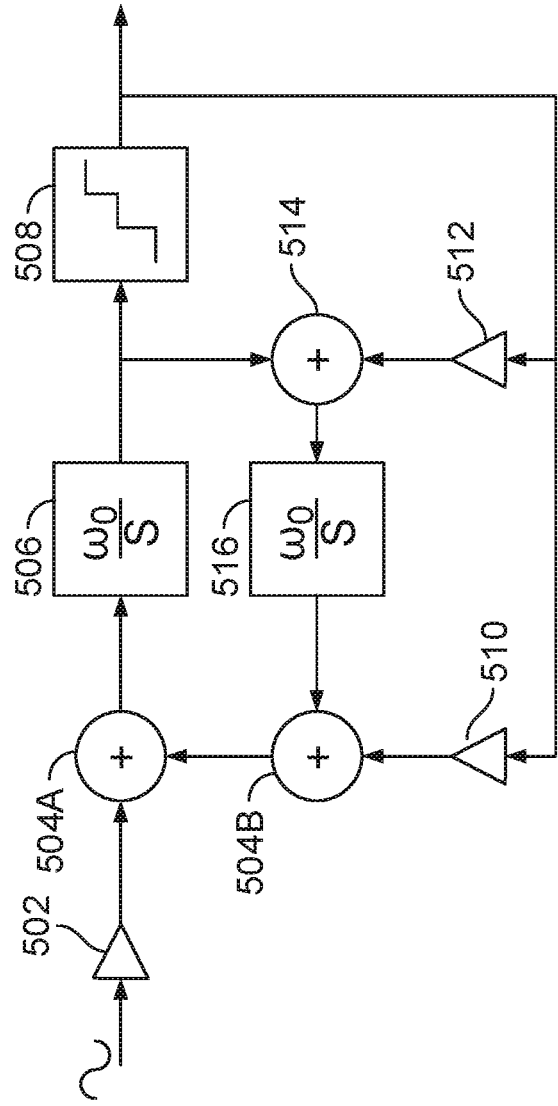
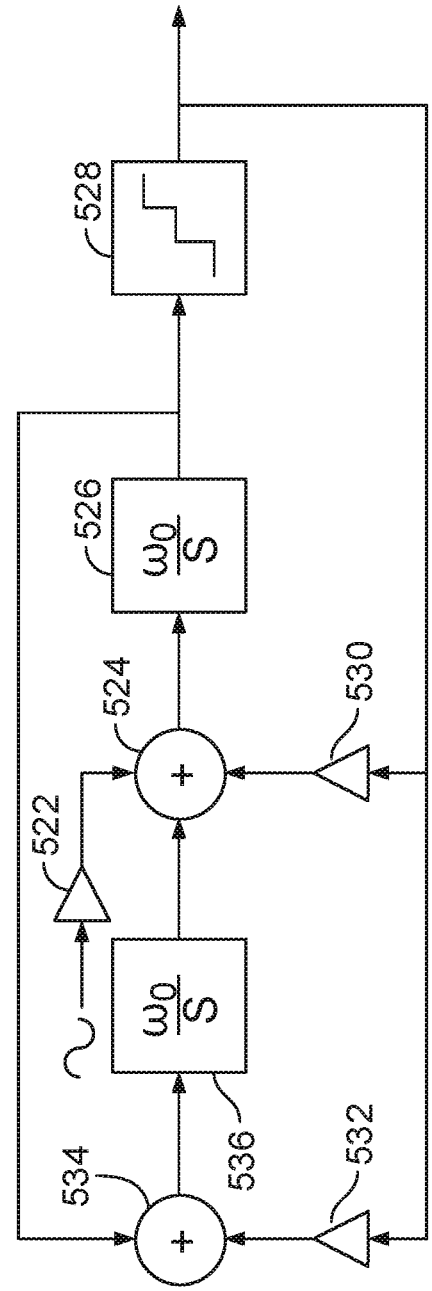
FIG. 5A
FIG. 5B

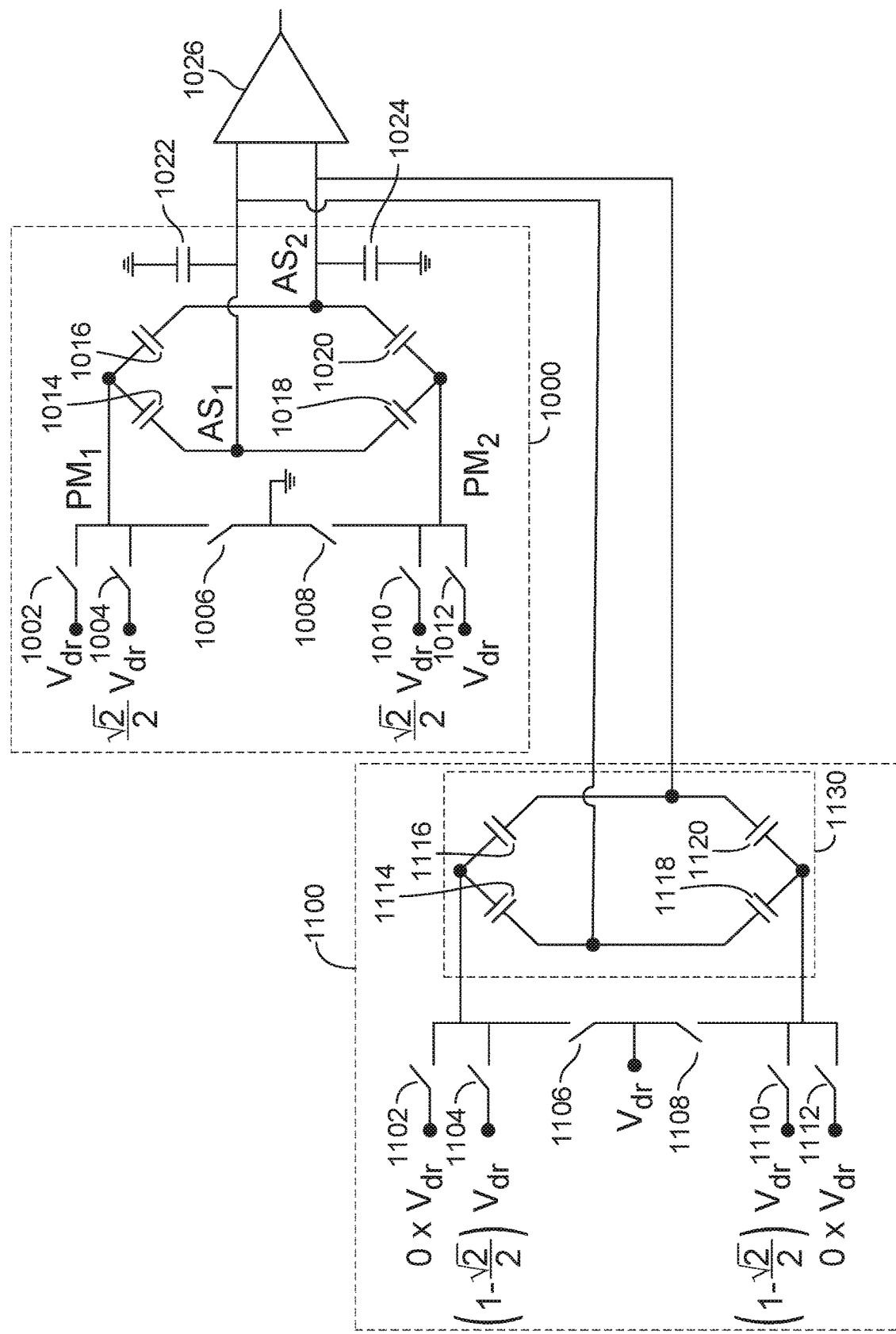

METHOD AND DEVICE FOR BAND-PASS SENSOR DATA ACQUISITION

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., for recognizing skid or roll-over conditions).

Motion sensors such as accelerometers and gyroscopes may be manufactured as microelectromechanical (MEMS) sensors that are fabricated using semiconductor manufacturing techniques. A MEMS sensor may include movable proof masses that can respond to forces such as linear acceleration (e.g., for MEMS accelerometers), angular velocity (e.g., for MEMS gyroscopes), and magnetic field. The operation of these forces on the movable proof masses may be measured based on the movement of the proof masses in response to the forces. In some implementations, this movement is measured based on distance between the movable proof masses and electrodes, which form capacitors for sensing the movement.

SUMMARY OF THE INVENTION

In an embodiment of the present disclosure a method comprises generating, based on a distance between two components of a microelectromechanical (MEMS) device, a charge representative of a capacitance that changes based on the distance and a periodic signal. The method may further comprise receiving, at an input node of an amplifier, the charge, a first feedback signal, and a second feedback signal, wherein the first feedback signal is associated with a filter having a passband for the periodic signal. The method may further comprise providing, from an output node of the amplifier, an amplifier output signal based on the charge, the first feedback signal, and the second feedback signal. The method may further comprise generating a digital output signal based on the amplifier output signal, wherein the second feedback signal is based on the digital output signal.

In an embodiment of the present disclosure, a microelectromechanical (MEMS) sensor comprises at least one proof mass and at least one electrode, wherein the at least one proof mass and the at least one electrode generate a charge representative of a capacitance that changes based on a periodic signal and a distance between the at least one proof mass and the at least one electrode. The MEMS sensor may further comprise an amplifier comprising an input node and an output node, wherein the input node is coupled to receive the charge, a first feedback signal, and a second feedback signal, wherein the first feedback signal is associated with a filter having a passband for the periodic signal, and wherein an amplifier signal provided by the output node is based on the charge, the first feedback signal, and the second feedback signal. The MEMS sensor may further comprise an analog-to-digital converter configured to generate a digital output signal based on the amplifier output signal, wherein the second feedback signal is based on the digital output signal.

In an embodiment of the present disclosure, a microelectromechanical (MEMS) sensor comprises a plurality of proof masses and a plurality of electrodes, wherein the plurality of proof masses and the plurality of electrodes generate a charge representative of a capacitance that changes based on a periodic signal and a distance between the at least one proof mass and the at least one electrode. The MEMS sensor may further comprise control circuitry configured to generate the periodic signal based on application of a first signal to a first proof mass of the plurality of proof masses during a first time period, application of a second signal to the first moveable mass during a second time period, application of the first signal to the first proof mass during a third time period, application of a third signal to a second proof mass of the plurality of proof masses during a fourth time period, application of a fourth signal to the second moveable mass during a fifth time period, and application of the third signal to the second proof mass during a sixth time period, wherein the second signal is larger than the first signal and the fourth signal is larger than the third signal.

BRIEF DESCRIPTION OF THE DRAWINGS

The above and other features of the present disclosure, its nature and various advantages will be more apparent upon consideration of the following detailed description, taken in conjunction with the accompanying drawings in which:

FIGS. 2A-2C show illustrative sense circuits in accordance with an embodiment of the present disclosure;

FIGS. 5A-5B show illustrative block diagrams of the sense circuits of FIG. 3 and FIG. 4 in accordance with an embodiment of the present disclosure;

FIG. 10 shows an illustrative circuit for supplying an approximation of a sinusoidal input signal coupled to a common mode compensation circuit in accordance with an embodiment of the present disclosure.

DETAILED DESCRIPTION

Figure 1:
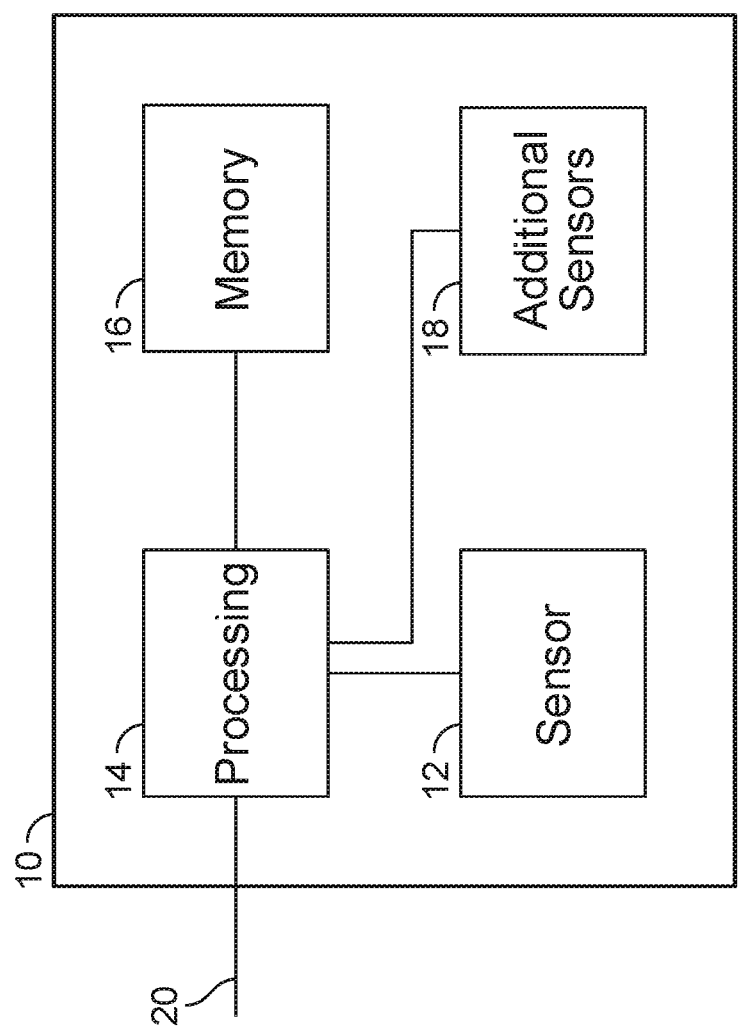
FIG. 1 shows an illustrative motion sensing system in accordance with an embodiment of the present disclosure.

An exemplary MEMS sensor such as a MEMS inertial sensor may utilize capacitive sensing techniques to measure motion such as linear acceleration or angular velocity. For example, the MEMS sensor may include a suspended spring-mass system having masses such as proof masses suspended from springs and other components such as additional masses and lever arms (e.g., to facilitate rotational motion). The components of the suspended spring-mass system may be configured to facilitate movement of the proof masses in response to the sensed inertial force. The movement of the proof masses in response to the sensed inertial force may be in-plane or out-of-plane, and results in a change in distance with one or more fixed electrodes. The proof masses and the fixed electrodes are at different potentials such that a capacitance between these components changes based on the change in distance. Although the present disclosure may describe embodiments relating to inertial force MEMS sensors, it will be understood that the principles described herein may be similarly applied to other capacitance-based devices, such as MEMS pressure sensors, magnetometers, and microphones.

In an exemplary embodiment of an accelerometer, the proof masses may be suspended such that linear acceleration in a particular direction causes a movement of the proof mass in proportion to the magnitude of the linear acceleration, while limiting movement of the proof mass in other directions (e.g., based on the relative location and rigidity of springs and other components of the suspended spring-mass system). A periodic signal may be applied to the proof masses or electrodes, such that the sensed capacitance is based on the periodic signal and the distance between the proof masses and electrodes. In an exemplary embodiment of a gyroscope, a periodic drive signal may be applied (e.g., by fixed electrostatic drive electrodes) to one or more components of the suspended spring-mass system to cause a dithering drive motion of one or more masses of the suspended spring-mass system. An angular velocity about an axis perpendicular to the direction of the drive motion results in a Coriolis force that is experienced by the driven masses in a direction that is perpendicular to the direction of the drive motion and the axis of rotation. The proof mass may experience the Coriolis force directly (e.g., as a driven mass) or may be coupled to correspond to a Coriolis force experienced by the driven mass. Fixed electrodes may be located relative to the proof masses in the direction of the Coriolis force, such that capacitances based on the distance between the proof masses and fixed electrodes vary in proportion to the Coriolis force. Because the drive motion is a dithering motion, the resulting Coriolis force for a particular angular velocity about a sense axis changes direction at the same frequency as the dithering motion based on the changing direction of the dithering motion. Thus, the distance and capacitance between the proof masses and the fixed electrodes in response to angular velocity may vary with the frequency of the drive motion and having a magnitude that corresponds to the magnitude of the angular velocity.

The sensed capacitance is processed by sense circuitry to calculate the sensed inertial force. Sense circuitry may include discrete circuitry, hardware logic, code executing on a processor, other suitable processing hardware or software, or any suitable combination. In some embodiments, the sense circuitry may be integral to the MEMS sensor. An exemplary MEMS sensor may be fabricated as a plurality of layers bonded together, including a cap layer, a MEMS layer, and a substrate layer. The MEMS layer may be bonded between the cap and substrate layers and may include the suspended spring-mass system including the proof masses. Fixed electrodes may be located on one or both of the cap and substrate layers (e.g., to sense out-of-plane movement of the proof masses) and/or may be fixedly attached to anchors of the cap or substrate layer within the MEMS layer (e.g., to sense in-plane movement of the proof masses). Some or all of the sense circuitry may be integrated within one or both of the cap or substrate layers, e.g., as CMOS circuitry including discrete components and hardware logic to perform some or all of the functionality of the sense circuitry.

Sense circuitry may perform a variety of functions to process a sensed capacitance for use to determine a measured parameter such as linear acceleration or angular velocity. In some embodiments, the capacitance may be amplified to generate a voltage or current that is proportional to the capacitance (e.g., by a capacitance to voltage (C2V) converter). The amplified signal may undergo further processing such filtering, analog-to-digital (ADC) conversion, and demodulation operations. For example, an ADC converter may introduce quantization noise to the system, which may be filtered, for example, by a low-pass or band-pass filter such as a band-pass sigma-delta modulator. In some embodiments, the ADC converter and filter may be implemented with feedback from the ADC convertor coupled to one or more integrators or a resonator, which may be implemented with one or more RC/amplifier configurations. The amplified charge signal that is output from the C2V converter may be provided as an input to an amplifier of the filter for analog-to-digital conversion and filtering (e.g., by a band-pass sigma-delta modulator and ADC with feedback from the ADC to shape quantization noise) and the resulting digital representation of the amplified charge signal may be demodulated based on the frequency of the carrier signal (e.g., the drive frequency of a gyroscope or input signal frequency of an accelerometer). The resulting demodulated digital representation of the amplified charge signal may then be processed to determine the sensed force, for example, based on known correlations between the sensed capacitance and force based on the particular sensor design.

In some embodiments, the sensed charge signal may be input directly to an input node of one of the amplifiers of the filter without previously being amplified or otherwise processed by circuitry such as the C2V converter. The components of the filter may be modified such that the amplifier that receives the charge signal effectively performs the amplification function of the C2V convertor while still performing a filtering function (e.g., to shape quantization noise from the ADC). One or more feedback paths to the input node of the filter may be modified, for example, such that the amplifier that receives the charge signal amplifies the charge signal while also functioning as an integrator (e.g., of a band-pass sigma-delta modulator having a plurality of integrators), while feedback from the ADC convertor is also provided to the input node. In this manner, processing that is functionally substantially similar to the C2V/ADC/filter system described above may be accomplished without the need for the additional components of the C2V convertor, resulting in a reduced number of components, decreased power consumption, smaller package size, and reduced processing time.

The integrators described herein may be configured as two integrators in a feedback loop, which may jointly function as a resonator. In some embodiments, the multiple integrators and RC/amplifier configurations thereof may be replaced with a single amplifier implementing a resonator and including similar feedback from the ADC to shape quantization noise. The charge signal may be provided directly to the input node of the amplifier while RC feedback paths (e.g., from the rails of the amplifier) and feedback from the ADC are also provided to the input node. The resulting resonator and ADC circuit may amplify the charge signal while also shaping quantization noise. In some embodiments, the band-pass filter may be implemented with multiple resonators configured in series, in a manner that may include multiple related passbands, e.g., that overlap to extend the passband over a larger range of frequencies. In some embodiments, additional RC elements may be configured as high-pass or low-pass filtering elements depending on the system design. For example, series low-pass RC filtering elements may be suitable for small drive-to-clock frequency ratios and low power applications, while series high-pass RC filtering elements may be suitable for large drive-to-clock frequency ratio and low noise applications.

In some embodiments, an incremental ADC may be implemented utilizing reset switching within the combination amplifier/filter/ADC system. Reset switches may be implemented to selective open or short feedback signals to the one or more amplifiers of the system (e.g., to input nodes of amplifiers of a multiple-resonator system as described herein). The reset switches may be synchronized with accumulators, for example, that may be connected in parallel with the demodulated version of the output signal from the amplifier/filter/ADC system. Such a system may be suitable for applications involving round robin sensing or duty-cycle modes, and may be implemented with a smaller circuit area in some embodiments.

In some embodiments a periodic signal that is applied to the proof mass (e.g., directly applied as a potential or indirectly applied as a mechanical drive source) may be supplied to approximate a sinusoidal signal by selectively applying different magnitudes of square wave signals to the MEMS sensor. For example, multiple voltage sources having different voltages may be selectively switched (e.g., by transistors such as a CMOS T-gate) to be applied to the MEMS sensor in a periodic fashion to approximate a sign wave. In some embodiments, complimentary signals may be applied to a CMOS approximation of the MEMS sensor and supplied to the sense path of the MEMS sensor. These complementary signals may reduce a common-mode component of the periodic sine-wave approximation signal that is applied to the MEMS sensor.

FIG. 1 depicts an exemplary motion sensing system 10 in accordance with some embodiments of the present disclosure. Although particular components are depicted in FIG. 1, it will be understood that other suitable combinations of sensors, processing components, memory, and other circuitry may be utilized as necessary for different applications and systems. In an embodiment as described herein, the motion sensing system may include at least a MEMS gyroscope 12 and supporting circuitry, such as processing circuitry 14 and memory 16. In some embodiments, one or more additional sensors 18 (e.g., additional MEMS gyroscopes, MEMS accelerometers, MEMS microphones, MEMS pressure sensors, and a compass) may be included within the motion processing system 10 to provide an integrated motion processing unit ("MPU") (e.g., including 3 axes of MEMS gyroscope sensing, 3 axes of MEMS accelerometer sensing, microphone, pressure sensor, and compass).

Processing circuitry 14 may include one or more components providing necessary processing based on the requirements of the motion processing system 10. In some embodiments, processing circuitry 14 may include hardware control logic that may be integrated within a chip of a sensor (e.g., on a substrate or cap of a MEMS gyroscope 12 or other sensor 18, or on an adjacent portion of a chip to the MEMS gyroscope 12 or other sensor 18) to control the operation of the MEMS gyroscope 12 or other sensors 18 and perform aspects of processing for the MEMS gyroscope 12 or other sensors 18. In some embodiments, the MEMS gyroscope 12 and other sensors 18 may include one or more registers that allow aspects of the operation of hardware control logic to be modified (e.g., by modifying a value of a register). For example, in some embodiments one, or registers may be modified to change values (e.g., resistors, capacitors, filters, etc.) associated with the processing circuitry described herein. In some embodiments, processing circuitry 14 may also include a processor such as a microprocessor that executes software instructions, e.g., that are stored in memory 16. The microprocessor may control the operation of the MEMS gyroscope 12 by interacting with the hardware control logic, and process signals received from MEMS gyroscope 12. The microprocessor may interact with other sensors in a similar manner.

Although in some embodiments (not depicted in FIG. 1), the MEMS gyroscope 12 or other sensors 18 may communicate directly with external circuitry (e.g., via a serial bus or direct connection to sensor outputs and control inputs), in an embodiment the processing circuitry 14 may process data received from the MEMS gyroscope 12 and other sensors 18 and communicate with external components via a communication interface 20 (e.g., a SPI or I2C bus, or in automotive applications, a controller area network (CAN) or Local Interconnect Network (LIN) bus). The processing circuitry 14 may convert signals received from the MEMS gyroscope 12 and other sensors 18 into appropriate measurement units (e.g., based on settings provided by other computing units communicating over the communication bus 20) and perform more complex processing to determine measurements such as orientation or Euler angles, and in some embodiments, to determine from sensor data whether a particular activity (e.g., walking, running, braking, skidding, rolling, etc.) is taking place.

In some embodiments, certain types of information may be determined based on data from multiple MEMS inertial sensors 12 and other sensors 18, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

An exemplary MEMS gyroscope 12 may include one or more movable proof masses that are configured in a manner that permits the MEMS sensor to measure a desired force (e.g., linear acceleration, angular velocity, magnetic field, etc.) along an axis. In some embodiments, the one or more movable proof masses may be suspended from anchoring points, which may refer to any portion of the MEMS sensor that is fixed, such as an anchor that extends from a layer (e.g., a CMOS layer) that is parallel to the MEMS layer of the device, a frame of the MEMS layer of the device, or any other suitable portion of the MEMS device that is fixed relative to the movable proof masses. The proof masses may be arranged in a manner such that they move in response to measured force. The movement of the proof masses relative to a fixed surface (e.g., a fixed sense electrode extending into the MEMS layer or located parallel to the movable mass on the substrate) in response to the measured force causes a change in capacitance that is measured and scaled to determine the desired inertial parameter.

FIGS. 2A-2C show illustrative sense circuits in accordance with an embodiment of the present disclosure. Each of FIGS. 2A-2C includes respective capacitive sensing elements 202, 212, or 222, which corresponds to a sensed capacitance from a capacitive MEMS sensor as described herein, which is depicted as including a periodic component. As described herein, the capacitance may be periodic based on a signal provided to the sensor, or in some embodiments, based on a periodic drive motion. The periodic signal may function as a carrier signal with an envelope that varies based on the parameter being measured by the MEMS sensor (e.g., in exemplary inertial sensors, linear acceleration or angular velocity).

Referring to FIG. 2A, an exemplary charge sensed by capacitive sensing element 202 may be provided as an input to amplifier 206, which may have suitable gain, bandwidth and noise characteristics to function as a C2V convertor to output a value (e.g., voltage or current) that varies based on (e.g., is proportional to) the charge associated with capacitive sensing element 202. Capacitor 204 may be connected between the output node and input node of amplifier 206 and may be programmable to provide and adjust the gain of the system. The output of the amplifier 206 may have a frequency that corresponds to the frequency of the charge signal from capacitive sensing element 202, and in the embodiment of FIG. 2A, may be provided to mixer 208. A demodulating signal input to mixer 208 may have a frequency and phase that corresponds to the frequency and phase of the output from the amplifier 206, such that an output from mixer 208 generally corresponds to a baseband signal representative of the signal envelope for the sensed parameter of the MEMS sensor. The output from mixer 208 may be provided to a filter/analog-to-digital (ADC) converter 210, which may include a low-pass filter (e.g., a sigma-delta low-pass modulator) to shape quantization noise that is created by the filter/ADC converter 210. The resulting digital output signal may provide a digital representation of the sensed parameter for further analysis and processing (e.g., by processing circuitry as described herein).

Referring to FIG. 2B, an exemplary charge sensed by capacitive sensing element 212 may be provided as an input to amplifier 216, which may have suitable characteristics to function as a C2V convertor to output a value (e.g., voltage or current) that varies based on (e.g., is proportional to) the charge associated with capacitive sensing element 212. Capacitor 214 may be connected between the output node and input node of amplifier 216. The output of the amplifier 216 may have a frequency that correspond to the frequency of the charge signal from capacitive sensing element 212, and in the embodiment of FIG. 2B, may be provided to filter/ADC converter 220, which may include a band-pass filter (e.g., a sigma-delta band-pass modulator) to shape quantization noise that is created by the filter/ADC converter 220 while retaining signal information having a bandwidth to accommodate the baseband frequency about the carrier frequency. The resulting digital output signal may be provided to mixer 218. A demodulating signal input to mixer 218 may have a frequency and phase that corresponds to the frequency and phase of the output from the filter/ADC 220, such that an output from mixer 218 generally corresponds to a baseband digital output signal representative of the signal envelope for the sensed parameter of the MEMS sensor. This digital representation of the sensed parameter may be provided for further analysis and processing (e.g., by processing circuitry as described herein).

Referring to FIG. 2C, in accordance with the present disclosure, the exemplary charge sensed by capacitor 222 may be provided directly as an input to filter/ADC 230, i.e., without prior processing by a C2V converter (e.g., an amplifier coupled with a capacitor between its output and input nodes). The frequency of the signal from capacitor 222 may correspond to a carrier frequency for a baseband signal representative of the sensed parameter for the MEMS sensor. Filter/ADC converter 230 may include a band-pass filter (e.g., a sigma-delta band-pass modulator) to shape quantization noise that is created by the filter/ADC converter 230 while retaining signal information having a bandwidth to accommodate the baseband frequency about the carrier frequency. In an exemplary embodiment, one or more components of the band-pass filter (e.g., an integrator and/or resonator of a sigma-delta band-pass filter) may be modified to generate a signal having a voltage and/or current that is based on (e.g., proportional to) the received charge signal, as described herein. Filter/ADC converter 230 and the filter thereof (e.g., a sigma-delta band-pass modulator including processing of a received charge signal) may shape quantization noise that is created by the filter/ADC converter 230 while retaining signal information having a bandwidth to accommodate the baseband frequency about the carrier frequency. The resulting digital output signal may be provided to mixer 228. A demodulating signal input to mixer 228 may have a frequency and phase that corresponds to the frequency and phase of the output from the filter/ADC 230, such that an output from mixer 228 generally corresponds to a baseband digital output signal representative of the signal envelope for the sensed parameter of the MEMS sensor. This digital representation of the sensed parameter may be provided for further analysis and processing (e.g., by processing circuitry as described herein).

Figure 3:
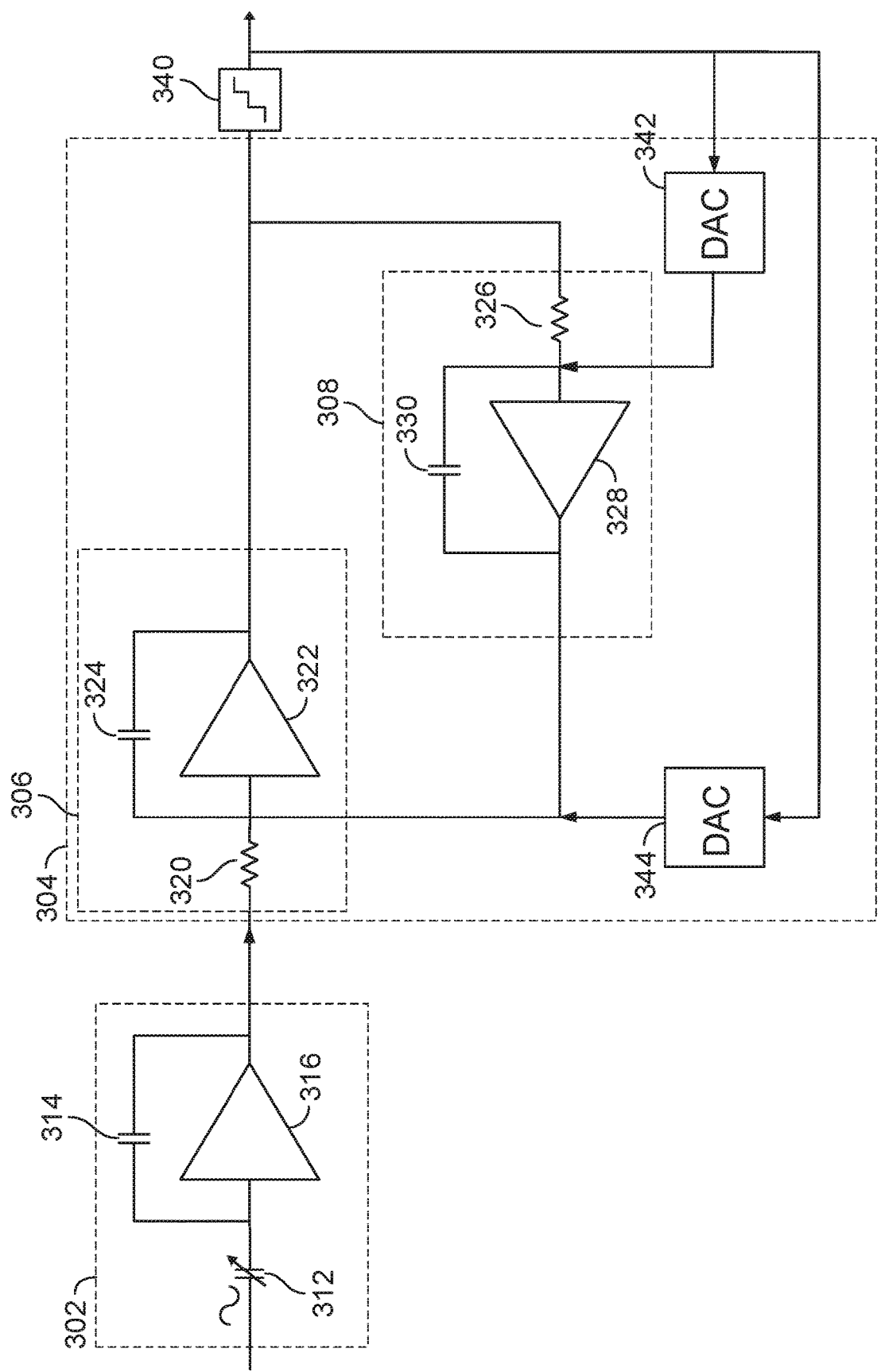
FIG. 3 shows an illustrative sense circuit including a C2V converter and filter in accordance with an embodiment of the present disclosure.

FIG. 3 shows an illustrative sense circuit including a C2V converter and multiple integrators of a filter in accordance with an embodiment of the present disclosure. Although it will be understood that the circuit depicted in FIG. 3 may be modified in a number of suitable manners (e.g., by adding, removing, or substituting certain components), in the exemplary embodiment of FIG. 3 the sense circuit may include a C2V converter 302, filter 304, and ADC 340.

C2V converter 302 may include a capacitive sensing element 312 that outputs a charge that has on a periodic component (e.g., based on a periodic input signal and/or a periodic motion of a proof mass) and a baseband component that is based on a motion being sensed by the MEMS sensor. The charge signal from the capacitive sensing element 312 may be provided to a C2V amplifier 316 and a capacitor 314 may be coupled between an output node of amplifier 316 and the input node of amplifier 316. A resulting amplified signal that is based on the charge signal (e.g., having a voltage and/or current proportional to the charge of capacitive sensing element 312) may be output to the filter 304.

Filter 304 may be designed to shape quantization noise generated by ADC 340. In the exemplary embodiment of FIG. 3, filter 304 may include a plurality of integrators 302 and 306, each of which receives feedback from ADC 340 via respective digital-to-analog converters (DAC) 342 (providing feedback integrator 308) and 344 (providing feedback to integrator 306). Integrator 320 may include a resistor 320 coupled to receive the amplified charge signal from C2V convertor 302. Resistor 320 may be coupled to an input node of amplifier 322, which in an embodiment may comprise an operational transconductance amplifier (OTA). A capacitor 324 may be coupled to the output node and the input node of amplifier 322, and a feedback signal from ADC 340 via DAC 344 may also be coupled to the input node of amplifier 322. The values of the resistors and capacitors may be determined based on mathematical transformations between s-domain and z-domain for optimum shaping of quantization noise. The output node of amplifier 322 of integrator 306 may be supplied to resistor 326 of integrator 308 and to ADC 340. Resistor 326 may be coupled to an input node of amplifier 328 of integrator 308, which in an embodiment may comprise an OTA. A capacitor 330 may be coupled to the output node and the input node of amplifier 328, and a feedback signal from ADC 340 via DAC 342 may also be coupled to the input node of amplifier 322. In the exemplary embodiment of FIG. 3, the charge signal from capacitive sensing element 312 may include a periodic and carrier component, which may be amplified and digitized for further processing with undesirable noise (e.g., quantization noise) shaped. For example, the digitized output signal from ADC 340 may be provided to a mixer to have the periodic carrier component removed such that the baseband signal representing the sensed change in capacitance can be further processed to determine a parameter such as linear acceleration or angular velocity.

Figure 4:
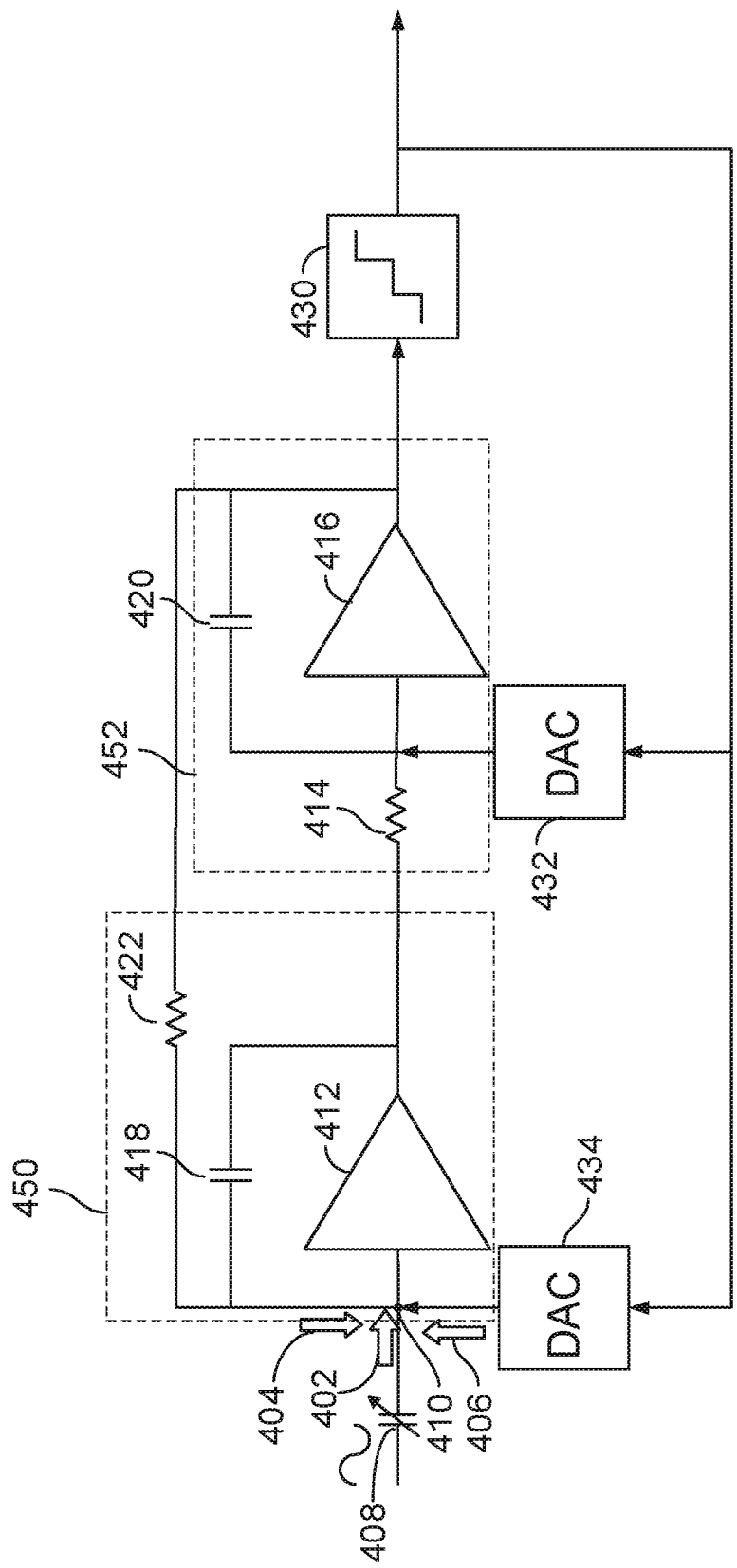
FIG. 4 shows an illustrative sense circuit including a charge signal provided at an input node of an amplifier of a filter in accordance with an embodiment of the present disclosure.

FIG. 4 shows an illustrative sense circuit including integrated C2V conversion at a common amplifier input in accordance with an embodiment of the present disclosure. A capacitive sensing element 408 outputs a charge that has on a periodic component (e.g., based on a periodic input signal and/or a periodic motion of a proof mass) and a baseband component that is based on a motion being sensed by the MEMS sensor. The charge signal from the capacitive sensing element 408 may be provided to an input node 410 of an amplifier 412 (e.g., an OTA amplifier) as a charge signal 402. The input node may also receive additional signal including a first feedback signal 404 that corresponds to a feedback system from a filter and a second feedback signal 406 that corresponds to a digitized output signal (e.g., from ADC 430 via DAC 434), as described herein. The amplifier 412 forms part of a filter (e.g., functioning as an integrator 450 based on resistor 422 and capacitor 418 supplying the first feedback signal 404) and also amplifies the received charge signal 402 from the capacitive sensing element 408.

An output signal from the amplifier 412 may be coupled to capacitor 418 and resistor 414. Resistor 414 may be coupled to an input node of amplifier 416 (e.g., an OTA amplifier), which may also be coupled to a feedback from a digital output signal (e.g., from ADC 430 via DAC 432) and a capacitor 420 parallel coupled between the input and output nodes of amplifier 416. The amplifier 416 forms another part of the filter, functioning as an integrator 452 based on resistor 414 and capacitor 420 in combination with the integrator of amplifier 412, resistor 422, and capacitor 418.

In an exemplary embodiment, the filter of FIG. 4 may comprise a sigma-delta band-pass filter having a passband to shape undesirable signal components such as quantization noise from ADC 430 while retaining desired signal components received from capacitive sensing element 408. The output of the filter (e.g., the amplified charge signal 402, filtered based on the integrators of FIG. 4, internal feedback paths, and feedback from the digital output of ADC 430) may be provided to ADC 430, and the digital output of ADC 430 may be provided to components such as a mixer to have the periodic carrier component removed such that the baseband signal representing the sensed change in capacitance can be further processed to determine a parameter such as linear acceleration or angular velocity.

FIGS. 5A-5B show illustrative block diagrams of the sense circuits of FIG. 3 and FIG. 4 in accordance with an embodiment of the present disclosure. The depicted block diagrams of FIGS. 5A-5B represent system level mathematical representations of the circuits of FIG. 3 (depicted in block diagram of FIG. 5A) and FIG. 4 (depicted in the block diagram of FIG. 5B) respectively. As demonstrated by FIG. 5A and FIG. 5B, the circuits of FIG. 3 and FIG. 4 correspond to equivalent mathematical representation. Although particular elements may be described as "linear" elements in FIGS. 5A and 5B, it will be understood that linear elements may not be perfectly or even primarily linear, depending on component types and values for corresponding circuit elements.

FIG. 5A depicts a block diagram that corresponds to the circuit of FIG. 3. Linear element 502 corresponds to the amplification provided to the charge output of capacitive sensing element 312 by C2V converter 302, and may correspond to a linear (e.g., proportional) output from C2V converter 302 in response to a given charge signal from capacitive sensing element 312. The output of linear element 502 is provided to adder 504A, which may correspond to the input to resistor 320 of integrator 306 of FIG. 3. Integrator 306 is represented by transfer element 506, which has a transfer function based on the selected components for amplifier 322, resistor 320, and capacitor 324. The output of transfer element 506 is provided to ADC 508 (corresponding to ADC 340) and adder 514 (corresponding to the input to resistor 326 of integrator 308). The output of ADC 508 is provided to linear element 512 (corresponding to DAC 342) and linear element 510 (corresponding to DAC 344) which provide a signal to adder 514 and 504B, respectively. Integrator 308 is represented by transfer element 516, which has a transfer function based on the selected components for amplifier 328, resistor 326, and capacitor 330. The output of transfer element 516 is provided to adder 504B along with the output of linear element 510, which corresponds to the input node to the amplifier 322 of integrator 306.

FIG. 5B depicts a block diagram that corresponds to the circuit of FIG. 4. Linear element 522 corresponds to the amplification provided to the charge signal 402 from capacitive sensing element 408 by amplifier 412, and may correspond to a linear (e.g., proportional) output from amplifier 412 in response to a given charge signal 402 from capacitive sensing element 408. The output of linear element 522 is provided to adder 524, which may correspond to the input to resistor 414 of integrator 452 of FIG. 4. Integrator 452 is represented by transfer element 526, which has a transfer function based on the selected components for amplifier 416, resistor 414, and capacitor 420. The output of transfer element 526 is provided to ADC 528 (corresponding to ADC 430) and adder 534 (corresponding to the feedback to resistor 422 of integrator 450). The output of ADC 528 is provided to linear element 532 (corresponding to DAC 432) and linear element 530 (corresponding to DAC 434) which provide a signal to adder 534 and 524, respectively. Integrator 450 is represented by transfer element 536, which has a transfer function based on the selected components for amplifier 412, resistor 422, and capacitor 418. The output of transfer element 536 is provided to adder 524 along with the output of linear element 530, which corresponds to the input node to the amplifier 412 of integrator 450.

Figure 6A:
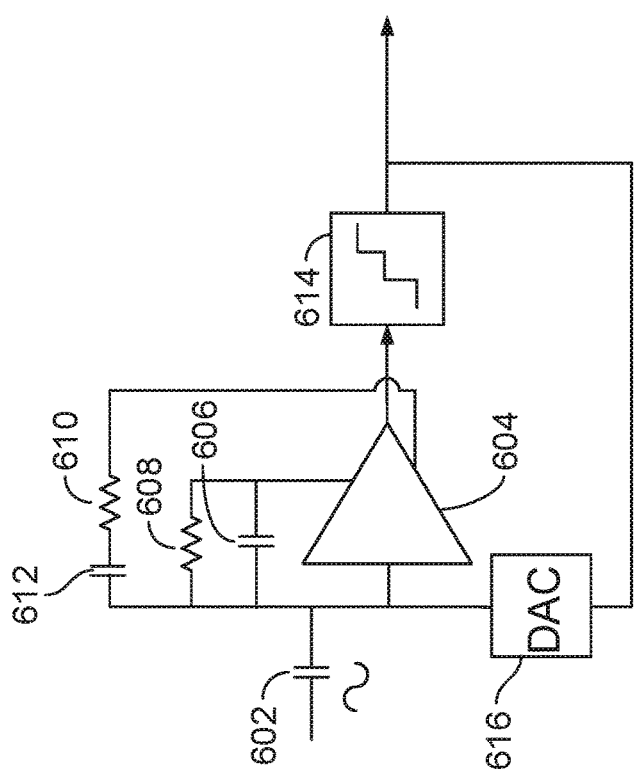
FIGS. 6A-6B show an illustrative sense circuit including a charge signal provided at an input node of an amplifier of a resonator circuit and a block diagram of this sense circuit in accordance with an embodiment of the present disclosure.
Figure 6B:
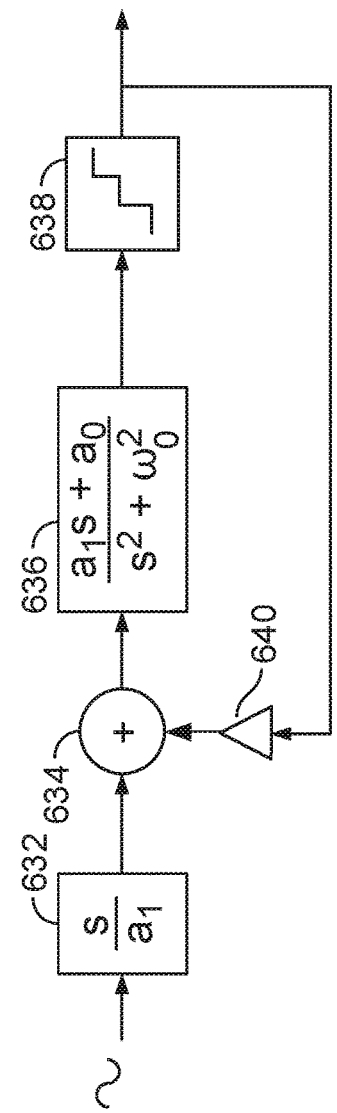

FIGS. 6A-6B show an illustrative sense circuit including a charge signal provided at an input node of an amplifier of a resonator circuit and a block diagram of this sense circuit in accordance with an embodiment of the present disclosure. As described herein, the sense circuit of FIG. 4 and FIG. 5B may include a plurality of integrators, which may collectively operate as a resonator that functions as a band-filter about a carrier frequency associated with a periodic signal or motion provided to the MEMS sensor and sensed by a capacitive sensing element such as capacitive sensing element 602 of FIG. 6.

As depicted in FIG. 6A, a charge signal from capacitive sensing element 602 may be provided to an input node of amplifier 604, which in an exemplary embodiment may be an OTA amplifier. The output rails of amplifier 604 may be connected to respective RC feedback circuits to provide desired characteristics for the resonator (e.g., a desired passband). In the exemplary embodiment of FIG. 6, the resonator includes a series resistor 610 and capacitor 612 coupled between a supply rail of amplifier 604 and the input node of amplifier 604. Parallel-connected resistor 608 and capacitor 606 are coupled between the other supply rail of amplifier 604 and the input node of amplifier 604. The output of amplifier 604 is supplied to ADC 614 and from ADC 614 as feedback to the input node of amplifier 604 (e.g., via DAC 616) and as a digital output signal for further processing such as removal of the carrier signal and identification of a measured parameter from the resulting digital baseband signal.

FIG. 6B depicts a block diagram mathematical model of the resonator circuit of FIG. 6A. Because of the behavior of the resonator circuit of FIG. 6A, the operations depicted in the block diagram of FIG. 6B may not depict a one-to-one correspondence with respective components of FIG. 6A, but it represents the overall functionality. A received charge signal may be provided to a first transfer element 632, the output of which may be provided to adder element 634. Adder element 634 also receives feedback from ADC 638 via DAC 640. The signals received at adder element 634 are provided to transfer element 636, which may exhibit a second order transfer function based on the respective selection of components and values of the resonator of FIG. 6A. The output of transfer element 636 is provided to ADC 638, and from ADC 638 for further processing and as feedback to adder 634.

Figure 7A:
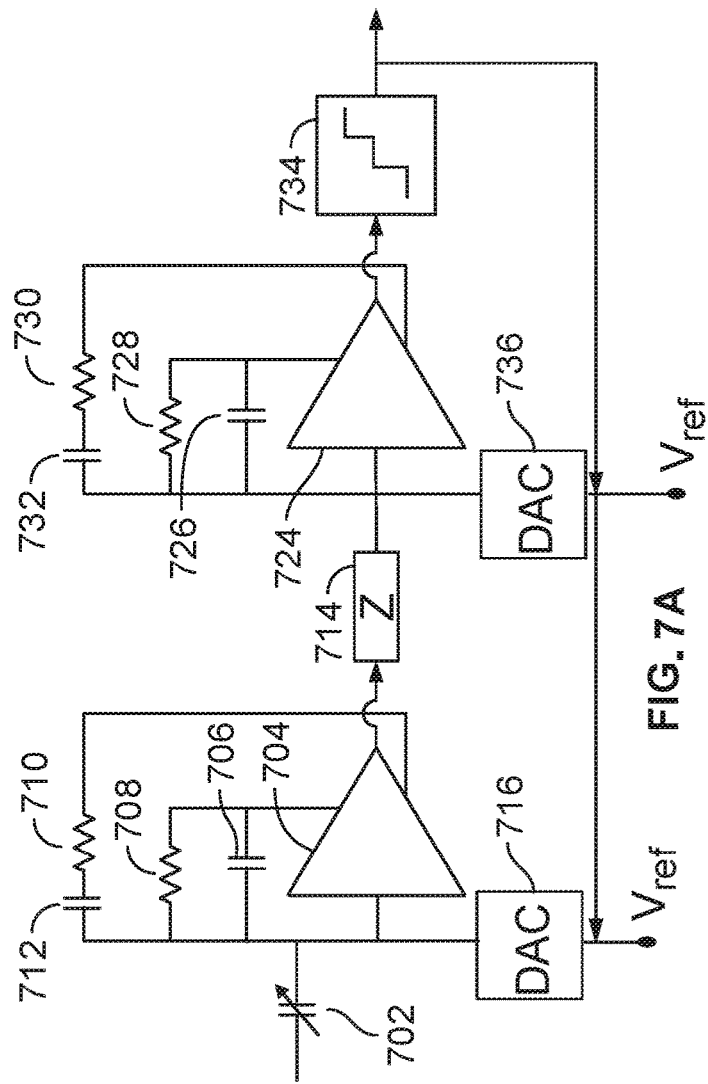
FIGS. 7A-7B show an illustrative sense circuit including a charge signal provided at an input node of an amplifier of a first resonator circuit of multiple resonator circuits and a block diagram of this sense circuit in accordance with an embodiment of the present disclosure.
Figure 7B:
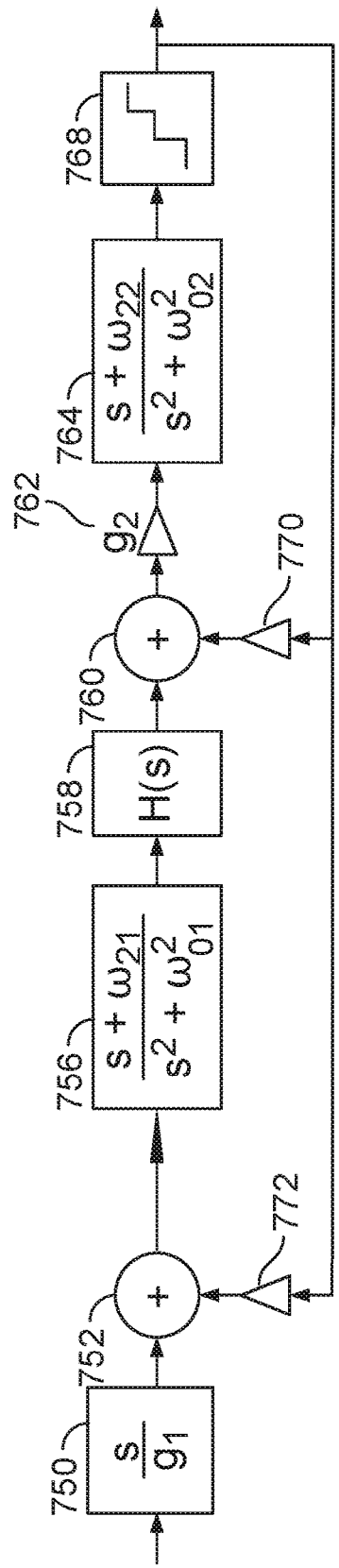

FIGS. 7A-7B show an illustrative sense circuit including a charge signal provided at an input node of an amplifier of a first resonator circuit of multiple series resonator circuits and a block diagram of this sense circuit in accordance with an embodiment of the present disclosure. As depicted in FIG. 7A, a charge signal from capacitive sensing element 702 may be provided to an input node of amplifier 704, which in an exemplary embodiment may be an OTA amplifier. The supply rails of amplifier 704 may be connected to respective RC feedback circuits to provide desired characteristics for the resonator (e.g., a desired passband). In the exemplary embodiment of FIG. 7A, the resonator includes a series resistor 710 and capacitor 712 coupled between a supply rail of amplifier 704 and the input node of amplifier 704. Parallel-connected resistor 708 and capacitor 706 are coupled between the other supply rail of amplifier 704 and the input node of amplifier 704.

The output of amplifier 704 is supplied to a filter circuit 714 that is coupled between a first resonator (e.g., associated with amplifier 704) and a second resonator (e.g., associated with amplifier 724). In an embodiment, the resonator associated with amplifier 704 may include a first passband and the resonator associated with amplifier 724 may be associated with a second passband. The components of the resonators may be selected such that the passbands at least partially overlap, for example, to expand the overall passband of the combined resonators. Filter circuit 714 may be selected to include the passbands of the resonators. For example, a low-pass filter (e.g., implemented as an RC circuit with a grounded capacitor coupled between two series resistors) may be suitable for small clock-to-drive frequency ratio applications with low power requirements, while a high-pass filter (e.g., implemented as na RC series circuit) may be suitable for large clock-to-drive frequency ratio applications with low noise requirement. It will be understood that other filter types and combinations thereof may be utilized in other circumstances.

The output of filter circuit 714 may be provided to an input node of amplifier 724, which in an exemplary embodiment may be an OTA amplifier. The supply rails of amplifier 724 may be connected to respective RC feedback circuits to provide desired characteristics for the resonator of amplifier 724 (e.g., a desired passband). In the exemplary embodiment of FIG. 7A, the resonator includes a series resistor 730 and capacitor 732 coupled between a supply rail of amplifier 724 and the input node of amplifier 724. Parallel-connected resistor 728 and capacitor 726 are coupled between the other supply rail of amplifier 724 and the input node of amplifier 724. The output of amplifier 724 is supplied to ADC 734 and from ADC 734 as feedback to the input node of amplifier 704 (e.g., via DAC 716), as feedback to the input node of amplifier 724 (e.g., via DAC 736), and as a digital output signal for further processing such as removal of the carrier signal and identification of a measured parameter from the resulting digital baseband signal, as described herein.

FIG. 7B depicts a block diagram mathematical model of the circuit of FIG. 7A. Because of the behavior of the resonator circuit of FIG. 7A, the operations depicted in the block diagram of FIG. 7B may not depict a one-to-one correspondence with respective components of FIG. 7A. A received charge signal may be provided to a first transfer element 750, the output of which may be provided to adder element 752. Adder element 752 also receives feedback from ADC 768 via DAC 772. The signals received at adder element 752 are provided to transfer element 756, which may exhibit a second order transfer function based on the respective selection of components and values of the resonator associated with amplifier 704 of FIG. 7A. The output of transfer element 756 may be processed by filter 758, which may have a transfer function associated with a selected filter as described above, and provided from filter 758 to adder 760, which also receives feedback from ADC 768 via DAC 770. The signals received at adder element 760 are provided to transfer element 764, which may exhibit a second order transfer function based on the respective selection of components and values of the resonator associated with amplifier 724 of FIG. 7A. The output of transfer element 764 is provided to ADC 768, and from ADC 768 for further processing and as feedback to adders 752 and 760.

Figure 8:
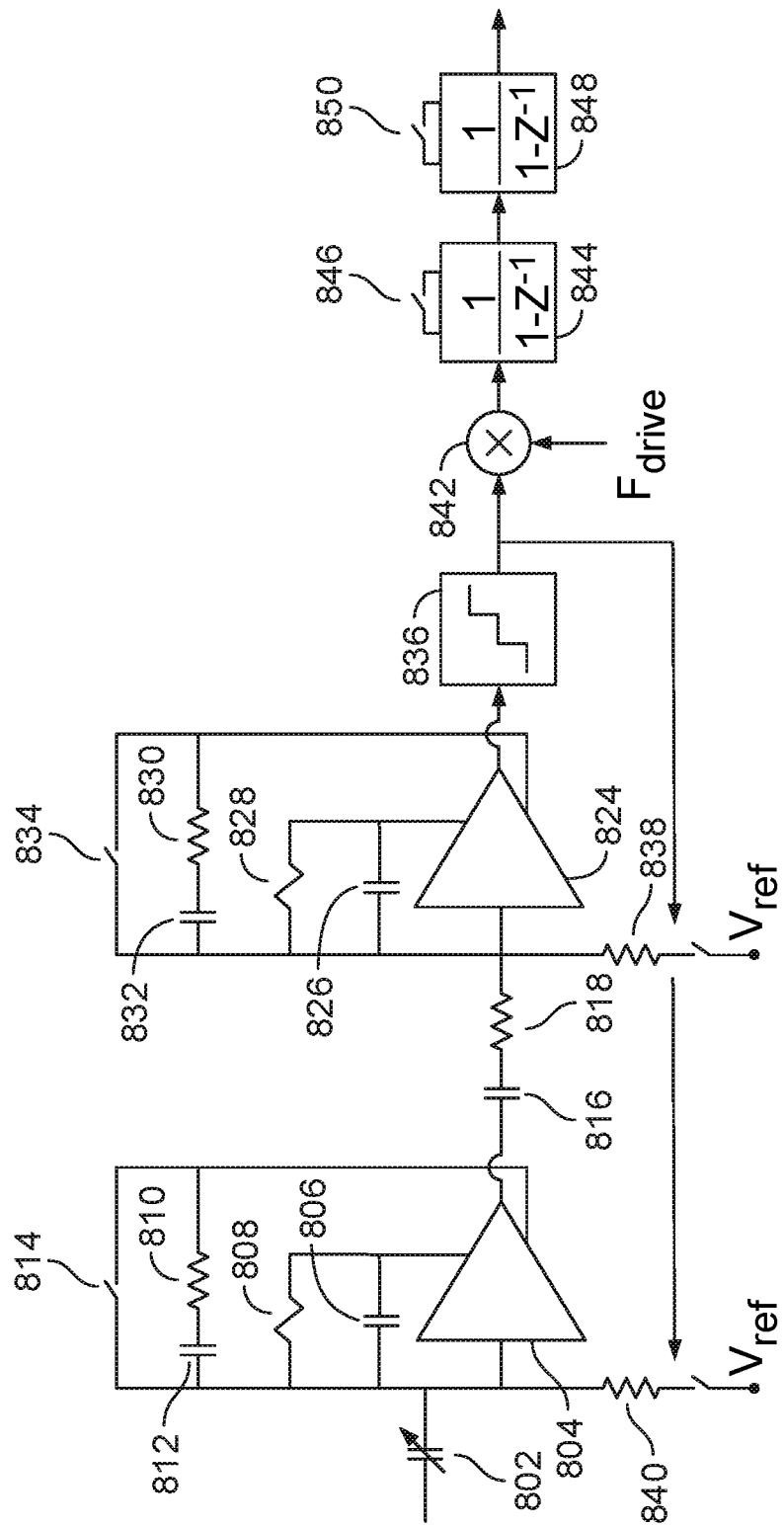
FIG. 8 shows an illustrative sense circuit including a charge signal provided at an input node of an amplifier of a first resonator circuit of multiple resonator circuits and including accumulator and reset circuitry in accordance with an embodiment of the present disclosure.

FIG. 8 shows an illustrative sense circuit including a charge signal provided at an input node of an amplifier of a first resonator circuit of multiple resonator circuits and including accumulator and reset circuitry in accordance with an embodiment of the present disclosure. As depicted in FIG. 8, a charge signal from capacitive sensing element 802 may be provided to an input node of amplifier 804, which in an exemplary embodiment may be an OTA amplifier. The output rails of amplifier 804 may be connected to respective RC feedback circuits to provide desired characteristics for the resonator (e.g., a desired passband). In the exemplary embodiment of FIG. 8, the resonator associated with amplifier 804 includes a series resistor 810 and capacitor 812 coupled between an output rail of amplifier 804 and the input node of amplifier 804. Parallel-connected resistor 808 and capacitor 806 are coupled between the other output rail of amplifier 804 and the input node of amplifier 804. A reset switch 814 is coupled in parallel with the RC feedback circuits, and may be selectively reset at selected times and durations with other reset switches of FIG. 8.

The output of amplifier 804 is supplied to a filter circuit that in the exemplary embodiment of FIG. 8 is a high-pass RC filter circuit including series-connected capacitor 816 and resistor 818, although other suitable filters and components may be used as described herein. The output from resistor 818 may be provided to an input node of amplifier 824, which in an exemplary embodiment may be an OTA amplifier. The supply rails of amplifier 824 may be connected to respective RC feedback circuits to provide desired characteristics for the resonator of amplifier 824 (e.g., a desired passband). In the exemplary embodiment of FIG. 8, the resonator includes a series resistor 830 and capacitor 832 coupled between a supply rail of amplifier 824 and the input node of amplifier 824. Parallel-connected resistor 828 and capacitor 826 are coupled between the other supply rail of amplifier 824 and the input node of amplifier 824. A reset switch 834 is coupled in parallel with the RC feedback circuits, and may be selectively reset at selected times and durations. The output of amplifier 824 is supplied to ADC 836 and from ADC 836 as feedback to the input node of amplifier 804 (e.g., via DAC 840), as feedback to the input node of amplifier 824 (e.g., via DAC 838), and as a digital output signal for further processing.

In the embodiment of FIG. 8, a demodulator such as mixer 842 may receive the digital output signal as well as a signal having a frequency that corresponds to the drive signal frequency of the MEMS sensor (e.g., the carrier signal associated with the MEMS sensor) to output a baseband digital output signal. The baseband digital output signal may be provided to a series of accumulators such as accumulates 844 and 848, which may be reset by reset switches 846 and 850, respectively. In an exemplary embodiment of FIG. 8, all of the reset switches may be closed and opened simultaneously to re-initialize the system, during which time the output signal is invalid due to the system being in a recover and freeze state.

Figure 9:
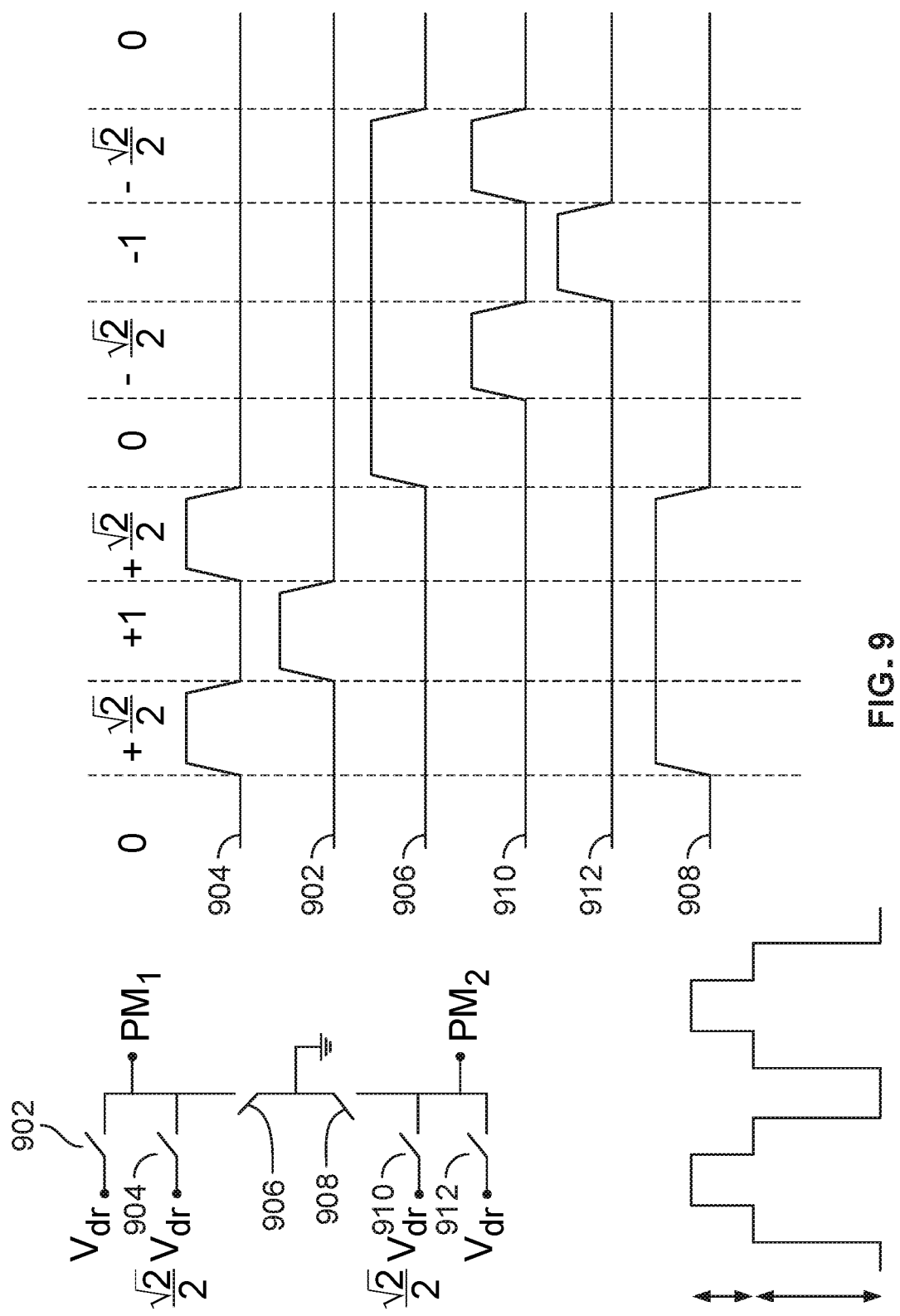
FIG. 9 shows an illustrative schematic and timing diagram of a periodic drive signal in accordance with an embodiment of the present disclosure.

FIG. 9 shows an illustrative schematic and timing diagram of a periodic drive signal in accordance with an embodiment of the present disclosure. As described herein, a MEMS sensor may include active MEMS components that receive a drive or carrier signal, which may be received directly as an electrical input and/or as a drive signal that initiates a drive motion of one or more suspended masses within a MEMS layer of the sensor. For simplicity of explanation, FIG. 9 may depict a direct connection of signal sources to one or more proof masses, although it will be understood that the drive signals as described herein may be provided in a variety of suitable manners. Moreover, while two proof masses (PM1 and PM2) are depicted for ease of explanation, it will be understood that the present disclosure may apply suitably to any suitable configuration and number of masses and type of masses or other MEMS components.

In the exemplary embodiment of FIG. 9, proof mass PM1 may be coupled to a first source via switch 902, a second source via switch 904, and a third source via switch 906. Proof mass PM2 may be coupled to a fourth source via switch 912, a fifth source via switch 910, and a sixth source via switch 908. In an exemplary embodiment, the switches may be implemented with CMOS transistors. In the embodiment herein, three sources are associated with each proof mass, although it will be understood that a proof mass may be coupled to more or fewer proof masses, for example, to increase or decrease a resolution of a periodic signal provided to each proof mass (e.g., increasing resolution by increasing a number of switches and sources coupled thereto). In the exemplary embodiment of FIG. 9, each source may have a fixed voltage, although it will be understood that source voltages or signals may be changed or may have their changing signal characteristics. In the embodiment of FIG. 9, proof mass PM1 may be coupled to a drive voltage $V_{dr}$ via switch 902, to a partial drive voltage $\sqrt{2}/2$ $V_{dr}$ via switch 904, and to ground via switch 906. Proof mass PM2 may be coupled to a drive voltage $V_{dr}$ via switch 912, to a partial drive voltage $\sqrt{2}/2$ $V_{dr}$ via switch 910, and to ground via switch 908.

The timing diagram of FIG. 9 depicts exemplary timing to provide a periodic signal to proof masses PM1 and PM2. During a first time period prior to operation of the MEMS sensor all of the switches are off, such that the proof masses are not connected to any of the sources. PM2 is then connected to ground via switch 908 while switches are open, thus connecting PM2 to ground for the first three time periods. PM1 is coupled to partial drive voltage $\sqrt{2}/2$ $V_{dr}$ via switch 904 during the first time period, drive voltage $V_{dr}$ via switch 902 during a second time period, and partial drive voltage $\sqrt{2}/2$ $V_{dr}$ via switch 904 during a third time period. Thus, during the first through third time periods, PM1 has a time-stepped signal that approximates a sine wave, the resolution of the approximated sine wave based on the provided source signals and switches. During a fourth time period, PM1 is coupled to ground via switch 906 and PM2 is disconnected from ground. PM2 is coupled to partial drive voltage $\sqrt{2}/2$ $V_{dr}$ via switch 910 during a fifth time period, drive voltage $V_{dr}$ via switch 912 during a sixth time period, and partial drive voltage $\sqrt{2}/2$ $V_{dr}$ via switch 910 during a seventh time period. Thus, during the fifth through seventh time periods, PM2 has a time-stepped signal that approximates a sine wave, the resolution of the approximated sine wave based on the provided source signals and switches. As is depicted in FIG. 10 below and described herein, the proof masses may form capacitors of the MEMS sensor (e.g., with fixed electrodes of the MEMS sensor) and may be coupled to output a differential capacitance which may correspond to a capacitive source signal.

FIG. 10 shows an illustrative circuit for supplying an approximation of a sinusoidal input signal coupled to a common mode compensation circuit in accordance with an embodiment of the present disclosure. It may be desirable to provide differential periodic signals to each of a plurality of masses (e.g., proof masses) as electrical signals, mechanical drive signals, or both. Such a signal may result in differential capacitances that may be processed to generate a sensed charge signal that is further processed, for example, by the circuits described herein. In the exemplary embodiment of FIG. 10, a periodic drive circuit such as the drive circuit of FIG. 9 may be coupled to measurement circuit including proof masses PM1 and PM2, which in turn may generate capacitances that may be measured.

In an exemplary embodiment, the drive and measurement circuit 1000 includes switches 1002, 1004, and 1006 coupled to selectively provide respective source voltages to proof mass PM1. Switch 1002 may be coupled to a drive voltage $V_{dr}$, switch 1004 may be coupled to a partial drive voltage $\sqrt{2}/2$ $V_{dr}$, and switch 1006 may be coupled to ground. Drive and measurement circuit 1000 may also include switches 1008, 1010, and 1012 coupled to selectively provide respective source voltages to proof mass PM2. Switch 1012 may be coupled to a drive voltage $V_{dr}$, switch 1010 may be coupled to a partial drive voltage $\sqrt{2}/2$ $V_{dr}$, and switch 1008 may be coupled to ground. PM1 and PM2 may form capacitors with each of sense electrodes AS1 and AS2, such that PM1 forms a capacitor 1014 with AS1, PM1 forms a capacitor 1016 with AS2, PM2 forms a capacitor 1018 with AS1, and PM2 forms a capacitor 1020 with AS2. Capacitors 1022 and 1024 are coupled to ground to hold the charge from the sense electrodes AS1 and AS2, which may be provided to the amplifier 1026 to output the charge signal.

The charge generated at AS1 and AS2, and stored at capacitors 1022 and 1024, may include a common mode component that it may be desirable to remove or reduce to increase the relative contribution of the differential mode signal to the capacitance signal that is output from the amplifier 1026. In an exemplary embodiment, a common mode compensation circuit 1100 may be coupled to the measurement circuitry of drive and measurement circuit 1000 to offset the common mode signal of that circuit. In an exemplary embodiment, switch 1102 may be associated with switch 1002 and may be coupled to ground, switch 1104 may be associated with switch 1004 and may be coupled to a voltage of $(1-\sqrt{2}/2\ V_{dr})$, switch 1106 may be associated with switch 1006 and may be coupled to a voltage of $V_{dr}$, switch 1112 may be associated with switch 1012 and may be coupled to ground, switch 1110 may be associated with switch 1010 and may be coupled to a voltage of $(1-\sqrt{2}/2\ V_{dr})$, switch 1108 may be associated with switch 1008 and may be coupled to a voltage of $V_{dr}$. That is, in the exemplary embodiment of FIG. 10, each of the switches of common mode compensation circuit are coupled to voltages that are complementary to the voltages coupled to the associated switches of the drive circuitry of drive and measurement circuit 1000. Although complementary voltages are depicted in FIG. 10, it will be understood that other voltages may be used to remove or reduce the common mode voltage of the drive and measurement circuit 1000, for example, based on different relative capacitance values for capacitors 1114, 1116, 1118, and 1120 as compared to capacitors 1014, 1016, 1018, and 1020.

In an embodiment, the switching of switch 1102 may correspond to switch 1002, the switching of switch 1104 may correspond to switch 1004, the switching of switch 1106 may correspond to switch 1006, the switching of switch 1108 may correspond to switch 1008, the switching of switch 1110 may correspond to switch 1010, and the switching of switch 1112 may correspond to switch 1012, although the switching may be modified in other embodiments. A replica MEMS circuit 1130 may be configured to simulate the capacitances formed by the proof masses and sense electrodes in the absence of a sensed force to simulate the common mode characteristics of these MEMS sensing components. Although the duplica MEMS circuit 1130 may be created in any suitable manner, in an exemplary embodiment the capacitors 1114, 1116, 1118, and 1120 of duplica MEMS circuit 1130 may be implemented in CMOS circuitry of the MEMS device. In some embodiments, capacitor 1114 may correspond to the capacitor 1014 formed between PM1 and AS1, capacitor 1116 may correspond to the capacitor 1016 formed between PM1 and AS2, capacitor 1118 may correspond to the capacitor 1018 formed between PM2 and AS1, and capacitor 1120 may correspond to the capacitor 1020 formed between PM2 and AS2. One of the outputs of duplica MEMS circuit 1130 may be coupled to AS1, capacitor 1022, and a first input of amplifier 1026, while a second output of duplica MEMS circuit 1130 may be coupled to AS2, capacitor 1024, and a second input of amplifier 1026, thus compensating for the common mode signals based on the associated switches, sources, and capacitances.

It will be understood that the common mode compensation described with respect to FIG. 10 may be applied to a variety of circuit, source, and MEMS device configurations, including a variety of suitable numbers and configurations of MEMS components, proof masses, sense electrodes, switches, sources, and other suitable components. In some embodiments, a common mode signal from MEMS components may be sensed and used to modify one or more components or parameters of a duplica MEMS circuit such as by switching out different capacitances, modifying source voltages, and modifying switching patterns and cycles.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

It will be understood that the particular signal sources, filters, capacitive sources, amplifiers, integrators, resonators, and components thereof are exemplary only and that various configurations from multiple figures may be combined in suitable manners. It will further be understood that other suitable modifications, additions, removals, optimizations, or variations may be implemented by a person having ordinary skill in the art or as is described herein.

What is claimed is:

1. A method comprising:
   generating, based on a distance between two components of a microelectromechanical (MEMS) device, a charge representative of a capacitance that changes based on the distance and a periodic signal;
   receiving, at an input node of an amplifier, the charge, a first feedback signal, and a second feedback signal, wherein the first feedback signal received from a first resonator including a filter having a passband for the periodic signal;
   providing, from an output node of the amplifier, an amplifier output signal based on the charge, the first feedback signal, and the second feedback signal, wherein the amplifier output signal is provided to a second resonator via one of a high-pass filter or a low-pass filter; and
   generating a digital output signal based on the amplifier output signal and an output of the second resonator, wherein the second feedback signal is based on the digital output signal.

2. The method of claim 1, further comprising a second capacitance coupled between the input node and the output node.

3. The method of claim 1, further comprising generating an analog feedback signal based on the digital output signal, and wherein the second feedback signal is based on the analog feedback signal.

4. The method of claim 1, wherein generating the digital output signal comprises performing incremental analog-to-digital conversion based on periodically resetting one or more components of the MEMS device.

5. The method of claim 1, wherein generating the digital output signal comprises:
   processing, by a second amplifier, the amplifier output signal to generate a second amplifier output signal; and
   generating the digital output signal based on the second amplifier output signal.

6. The method of claim 5, further comprising:
   converting the digital output signal to an analog-converted signal; and providing the analog-converted signal to the second amplifier, wherein the second amplifier output signal is based on the analog-converted signal.

7. The method of claim 1, wherein the periodic signal approximates a sinusoidal signal.

\* \* \* \* \*